(12) United States Patent
Matyac

(10) Patent No.: US 11,031,782 B2
(45) Date of Patent: Jun. 8, 2021

(54) PHOTOVOLTAIC TRANSFER SWITCH WITH NON-ESSENTIAL LOAD CUTOFF

(71) Applicant: Mark Matyac, Lawrenceville, GA (US)

(72) Inventor: Mark Matyac, Lawrenceville, GA (US)

( * ) Notice: Subject to any disclaimer, the term of this patent is extended or adjusted under 35 U.S.C. 154(b) by 0 days.

(21) Appl. No.: 16/599,826

(22) Filed: Oct. 11, 2019

(65) Prior Publication Data

US 2020/0044450 A1   Feb. 6, 2020

Related U.S. Application Data

(63) Continuation-in-part of application No. 15/825,644, filed on Nov. 29, 2017, now Pat. No. 10,498,166.

(Continued)

(51) Int. Cl.
  *H02J 3/14* (2006.01)
  *H02J 9/06* (2006.01)
(Continued)

(52) U.S. Cl.
  CPC .............. *H02J 3/14* (2013.01); *H01H 13/20* (2013.01); *H02J 3/383* (2013.01); *H02J 9/06* (2013.01);
(Continued)

(58) Field of Classification Search
  CPC .. H02J 3/14; H02J 9/06; H02J 13/0017; H02J 3/383; H02J 9/068; H02J 2310/14; H02J 3/386; H02J 9/062; H01H 13/20; H01H 2235/01; H01H 2300/018; Y02B 90/20; Y02B 70/3225; Y02B 70/30; Y02B 10/70; Y04S 20/242; Y04S 20/248; Y04S 20/222; Y04S 20/12; Y02E 10/76; Y02E 10/56
(Continued)

(56) References Cited

U.S. PATENT DOCUMENTS 5,027,051 A   6/1991  Lafferty
5,270,636 A   12/1993 Lafferty
(Continued)

OTHER PUBLICATIONS

Maehlum, Mathias Aarre: "Grid-Tied, Off-Grid and Hybrid Solar Systems", Aug. 14, 2013, Energy Informative (downloaded from http://energyinformative.org/grid-tied-off-grid-and-hybrid-solar-systems/).

(Continued)

*Primary Examiner* — Toan T Vu
(74) *Attorney, Agent, or Firm* — Bryan W. Bockhop; Bockhop Intellectual Property Law, LLC

(57) ABSTRACT

In an a power management system for managing a plurality of essential loads and a plurality of nonessential loads that can be fed electric power from an alternate power source and from a grid power source, a power distribution network transmits power from the alternate power source and the grid power source to the essential loads and to the nonessential loads. A grid power sensor senses a grid power failure. A wireless transmitter is coupled to the grid power sensor and transmits a decouple signal when the grid power sensor detects a grid power failure. A plurality couplers selectively couple the nonessential loads to the power distribution network. Each of the plurality of couplers includes a wireless receiver and a switch that responsive to the wireless receiver. The couplers also decouple at least one of the nonessential loads from the power distribution network when the decouple signal is received.

16 Claims, 5 Drawing Sheets

Related U.S. Application Data

(60) Provisional application No. 62/741,903, filed on Oct. 5, 2018.

(51) Int. Cl.
  H02J 13/00     (2006.01)
  H02J 3/38      (2006.01)
  H01H 13/20     (2006.01)

(52) U.S. Cl.
  CPC ...... H02J 13/0017 (2013.01); *H01H 2235/01* (2013.01); *H01H 2300/018* (2013.01); *H02J 3/386* (2013.01); *H02J 9/068* (2020.01); *H02J 2310/14* (2020.01)

(58) Field of Classification Search
  USPC ............................................. 307/64, 29, 32
  See application file for complete search history.

(56) References Cited

U.S. PATENT DOCUMENTS

| | | |
|---|---|---|
| 6,188,145 B1 | 2/2001 | Stewart |
| 6,914,418 B2 | 7/2005 | Sung |
| 7,843,085 B2 | 11/2010 | Ledenev et al. |
| 7,929,327 B2 | 4/2011 | Haines et al. |
| 2005/0077879 A1 | 4/2005 | Near |
| 2009/0152947 A1 | 6/2009 | Wang |
| 2010/0225167 A1* | 9/2010 | Stair ................ H02J 3/14 307/29 |
| 2011/0115295 A1 | 5/2011 | Moon et al. |
| 2011/0133558 A1 | 6/2011 | Park |
| 2011/0148205 A1* | 6/2011 | Moon ................ H02J 3/32 307/65 |
| 2012/0044014 A1 | 2/2012 | Stratakos et al. |
| 2012/0098350 A1 | 4/2012 | Campanella et al. |
| 2014/0084687 A1 | 3/2014 | Dent |
| 2016/0164295 A1 | 6/2016 | Cheng et al. |
| 2017/0264212 A1 | 9/2017 | Muguerza Olcoz et al. |
| 2017/0317501 A1 | 11/2017 | Moriyama |
| 2019/0081458 A1* | 3/2019 | Lapushner ............ H02J 3/0073 |
| 2019/0181659 A1* | 6/2019 | Kim ................ H01M 2/10 |

OTHER PUBLICATIONS

WIPO: "Notification of Transmittal of the International Search Report and the Written Opinion of the International Searching Authority, or the Declaration"; PCT Feb. 8, 2019 (related PCT case).

\* cited by examiner

PHOTOVOLTAIC TRANSFER SWITCH WITH NON-ESSENTIAL LOAD CUTOFF

CROSS-REFERENCE TO RELATED APPLICATION(S)

This application claims the benefit of U.S. Provisional Patent Application Ser. No. 62/741,903, filed Oct. 5, 2018, the entirety of which is hereby incorporated herein by reference.

This application is a continuation-in-part of, and claims the benefit of, U.S. patent application Ser. No. 15/825,644, filed Nov. 29, 2017, the entirety of which is hereby incorporated herein by reference.

BACKGROUND OF THE INVENTION

1. Field of the Invention

The present invention relates to power management systems and, more specifically, for a system managing power distribution to nonessential loads.

2. Description of the Related Art

Alternative energy sources, including solar power sources, are increasingly being used to power loads such as home and office electrical systems, which also receive electric power from the power grid. Typically, the alternative energy source produces direct current (DC) power that is fed to an inverter, which converts it to alternating current (AC) power and synchronizes the AC power with power on the grid. When the alternative energy source produces more power than is consumed by the load, excess power is delivered to the power grid. When the alternative energy source produces less power than is consumed by the load, the load takes power from the power grid in addition to that from the alternative power source.

Sometimes, the load gets disconnected from the power grid as a result of such events as fallen power lines. Typically, when this happens, the inverter is disconnected from the power grid to prevent hazards from alternative energy sourced power on the fallen lines. Unfortunately, when the inverter is disconnected from the grid, it is also disconnected from the load. Thus, the home or office will be without electric power, even though it could otherwise still be generated locally by the alternative energy source.

Many alternative energy sources can supply only limited quantities of power during off-grid situations. As a result, it is desirable to switch off nonessential loads when a power distribution system (such as home wiring) is being fed exclusively from an alternative energy source, thereby ensuring that essential loads have sufficient power to operate. While the decision as to which loads are essential and which loads a nonessential can be subjective, nonessential loads are generally those that are not critical for health, safety and economic reasons. Examples of nonessential loads can include such items as television sets, hair dryers, washing machines, etc. Examples of essential loads can include such items as medical systems, refrigerators, lighting systems in certain areas, etc.

Therefore, there is a need for an apparatus that disconnects an alternative energy source from the power grid while still supplying power to the load when the power grid fails.

Therefore, there is also a need for a device that disconnects non-essential loads when alternate energy source are providing power during grid failures.

SUMMARY OF THE INVENTION

The disadvantages of the prior art are overcome by the present invention which, in one aspect, is an apparatus for selectively coupling a load to a grid power source and an inverter that is fed electric power by an alternate power source. A first node is configured to be coupled to the load. A grid power sensor senses a state of the grid power source. A grid relay couples the grid power source to the first node when in a closed state and decouples the grid power source from the first node when in an open state. An inverter relay couples the inverter to the first node when in a closed state and decouples the inverter from the first node when in an open state. A controller is responsive to the grid power sensor and is programmed to: (i) cause the grid relay to be in the closed state and cause the inverter relay to be in the closed state when the grid power sensor indicates power is available from the grid; (ii) cause the grid relay to be in the open state when the grid power sensor indicates that power is not available from the grid; and (iii) cause the inverter relay to be in the open state when the grid power sensor indicates power is not available from the grid and when feedback from the grid relay indicates that the grid relay is in the closed state.

In another aspect, the invention is a system for selectively coupling a load to a grid power source that delivers power on a first grid power line and a second grid power line that is 180° out of phase with the first power line and an inverter that is fed electric power by an alternate power source and that delivers power on a first inverter power line and a second inverter power line that is 180° out of phase with the first power line. A first sub-node is configured to be coupled to a first phase contact of the load and a second sub-node is configured to be coupled to a second phase contact of the load. A first grid power sensor senses a state of the first grid power line and a second grid power sensor senses a state of the second grid power line. A grid relay selectively couples the first grid power line to the first sub-node and the second grid power line to the second sub-node. An inverter relay selectively couples the first inverter power line to the first sub-node and the second inverter power line to the second sub-node. A controller that receives feedback from the grid relay and is responsive to the grid power sensor and is programmed to: (i) cause the grid relay to couple the first grid power line to the first sub-node and the second grid power line to the second sub-node when the first grid power sensor indicates power is available from the first grid power line and from the second grid power line; (ii) cause the grid relay to decouple the first grid power line from the first sub-node and the second grid power line from the second sub-node when the first grid power sensor indicates power is not available from the first grid power line and from the second grid power line; and (iii) cause the inverter relay to decouple the first inverter power line from the first sub-node the second inverter power line from the second sub-node when the first grid power sensor indicates power is not available from the first grid power line and from the second grid power line and when the feedback from the grid relay indicates that the either the first grid power line is coupled to the first sub-node or the second grid power line is coupled to the second sub-node.

In another aspect, the invention is a method of switching a load between a grid power source and an alternative power source, in which a state of the grid power source is sensed. If the sensing step indicates that power is available from the grid power source then both the grid power source and the alternative power source are coupled to the load. If the sensing step indicates that power is not available from the grid power source then the grid power source is decoupled from the load. Whether the grid power source is decoupled from the load after the step of decoupling the grid power source from the load is sensed. If the grid power source is decoupled from the load, then the alternative power source is coupled to the load. If grid power is not available and the grid power source is coupled to the load, then the alternative power source is decoupled from the load.

In another aspect, the invention is a power management system for managing a plurality of essential loads and a plurality of nonessential loads that can be fed electric power from an alternate power source and from a grid power source. A power distribution network transmits power from the alternate power source and the grid power source to the essential loads and to the nonessential loads. A grid power sensor senses a grid power failure. A wireless transmitter is coupled to the grid power sensor and transmits a decouple signal when the grid power sensor detects a grid power failure. A plurality of couplers selectively couple the nonessential loads to the power distribution network. Each of the plurality of couplers includes a wireless receiver and a switch that responsive to the wireless receiver. The couplers also decouple at least one of the nonessential loads from the power distribution network when the decouple signal is received.

In yet another aspect, the invention is a method of switching a power distribution network between a grid power source and an alternative power source, in which a state of the grid power source is sensed. If a sensing step indicates that power is available from the grid power source then both the grid power source and the alternative power source are coupled to the power distribution network. If the sensing step indicates that power is not available from the grid power source then the grid power source is decoupled from the power distribution network. If an alternative power source is supplying power to the power distribution network, then a decouple signal is sent via a wireless transmitter. Upon receiving the decouple signal at a nonessential load, at least one nonessential load is decoupled from the power distribution network.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1A:
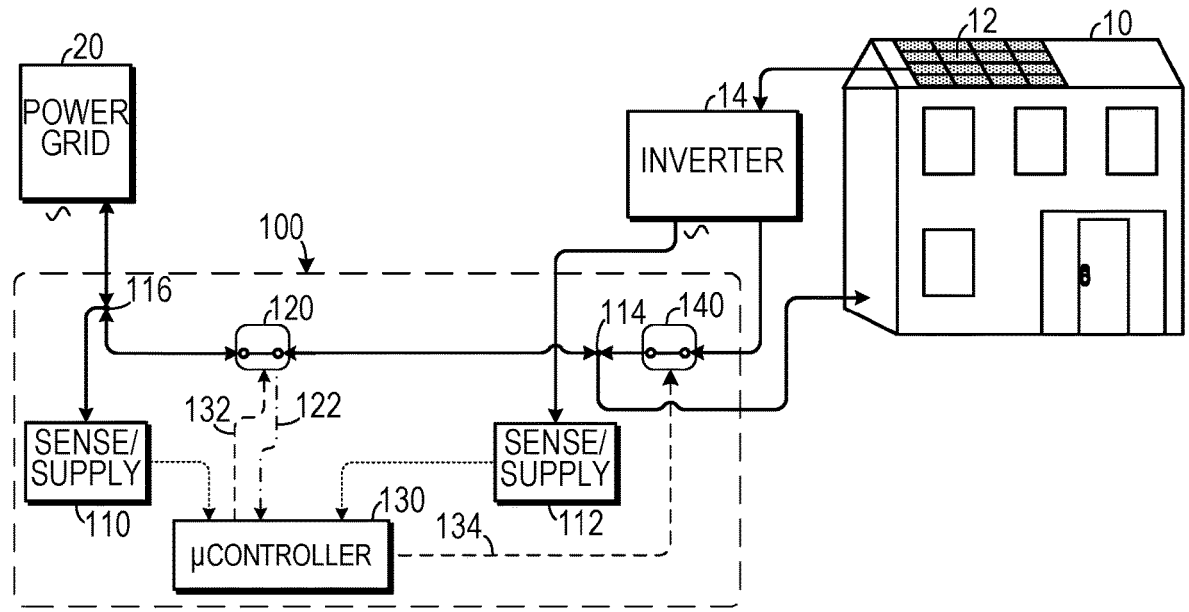
FIGS. 1A-1C are schematic diagrams of one embodiment of a switching apparatus demonstrating three modes of operation.

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one embodiment of an apparatus 100 for switching a load 10 (such as a breaker box busbar in a house or office) between a grid power source 20 and an alternative power source 12 (such as a photovoltaic system, a wind power system, a hydroelectric power system, a thermoelectric power system, etc.) employs an inverter 14 to transform direct current power into alternating current power that is in matched in phase with power from the grid power source 20. The apparatus 100 employs a grid relay 120 that selectively couples the grid power source 20, via a second node 116, to a first node 114. An inverter relay 140 (which could be one of many commonly-known controllable power relays rated to handle the expected current that would flow therethrough) selectively couples the inverter 14 to the first node 114. The first node 114 is coupled to the load 10 and, under normal operating conditions (as shown in FIG. 1A), the grid relay 120 and the inverter relay 140 will remain in a closed state so that power from both the power grid 20 and the inverter 14 can feed the load 10 and so that excess power from the inverter 14 can be fed to the power grid 20.

The grid relay 120 and the inverter relay 114 are both controlled by a microcontroller 130 (such as, in one representative embodiment, an MSP430-series microcontroller available from Texas Instruments), which receives power from both the grid power supply 110 (fed by the grid power source 20) and an inverter power supply 112 (fed by the inverter 14). Thus, if one of the grid power source 20 or the inverter 14 fails, the microcontroller 130 will still have power from the other.

Figure 1B:
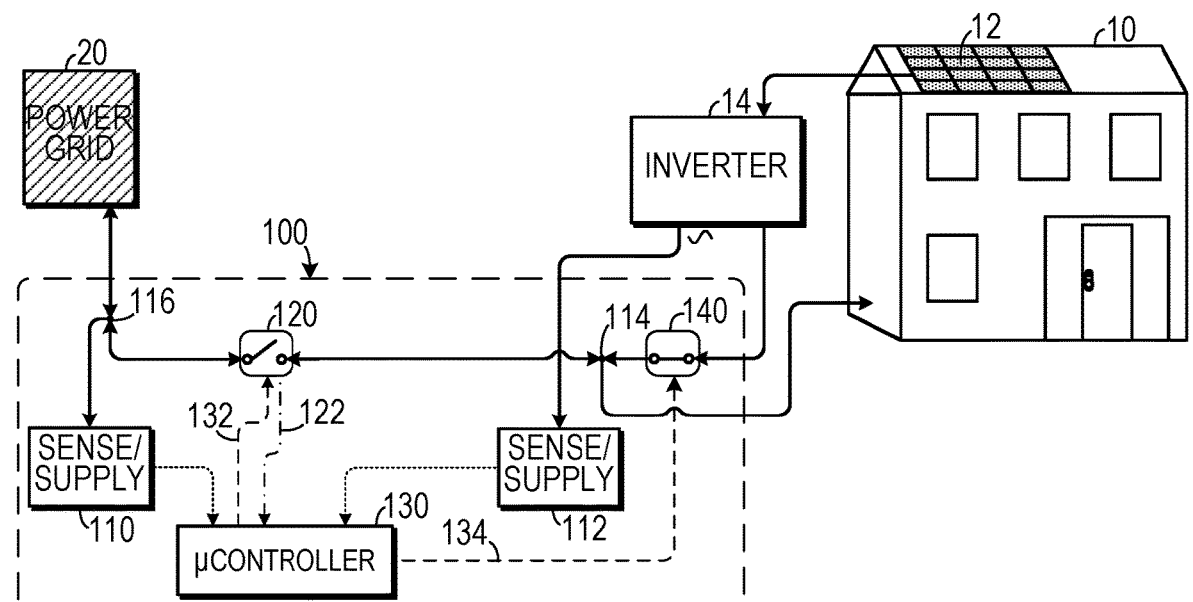

If, as shown in FIG. 1B, the voltage from the grid power supply 110 falls below a predetermined threshold (indicating grid power failure), then the microcontroller 130 will assert a, open signal on a grid relay line 132, thereby causing the grid relay 120 to open, thereby decoupling the power grid 20 from the first node 114. Feedback 122 from the grid relay 120 indicates if the grid relay 120 is in an open state and, if so, then the inverter relay 140 remains closed and power from the inverter 14 is fed to the load 10. Thus, the alternate power source 12 can still be used to meet the power requirements of the load 10 in the event of a grid power failure. Because the grid relay 120 decouples the first node from the grid power source 12 in this situation, no power from the inverter 14 is fed back to the power grid 20.

Figure 1C:
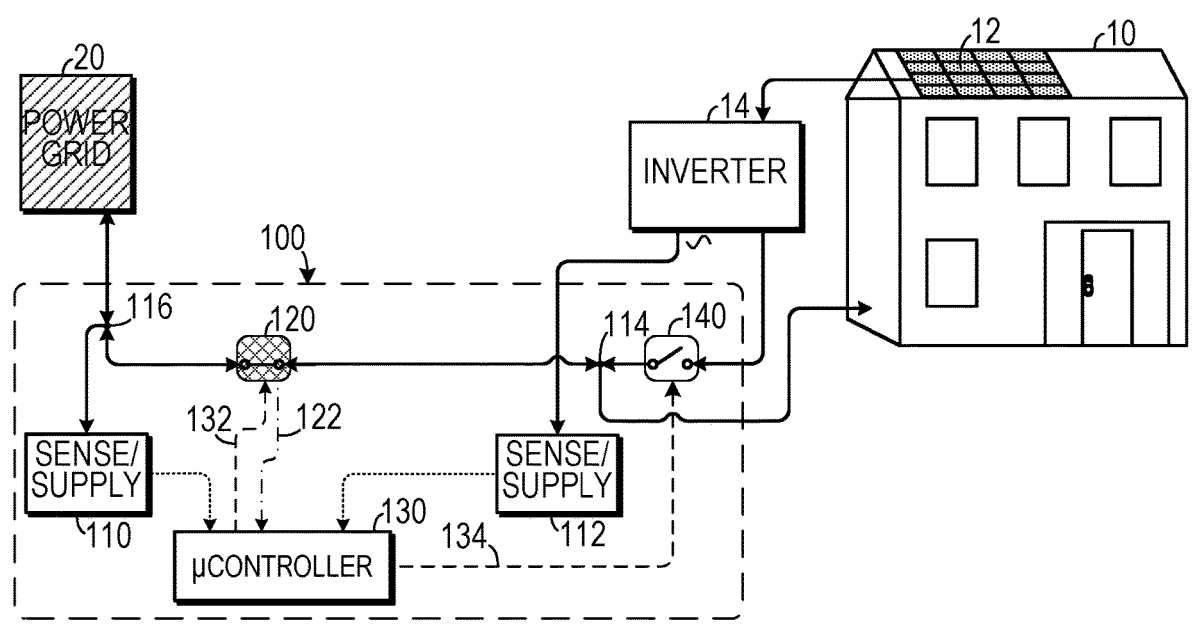

As shown in FIG. 1C, if feedback 122 from the grid relay 120 indicates that the grid relay 120 failed to open properly (indicating a failure of the grid relay 120) while at the same time power from the grid power supply 110 is below the threshold, then the microcontroller 130 will assert an open signal 134 causing the inverter relay 140 to open, thereby isolating the inverter 14 from the first node 114 so that inverter power is not fed onto either the power grid 20 or the load 10.

Figure 2:
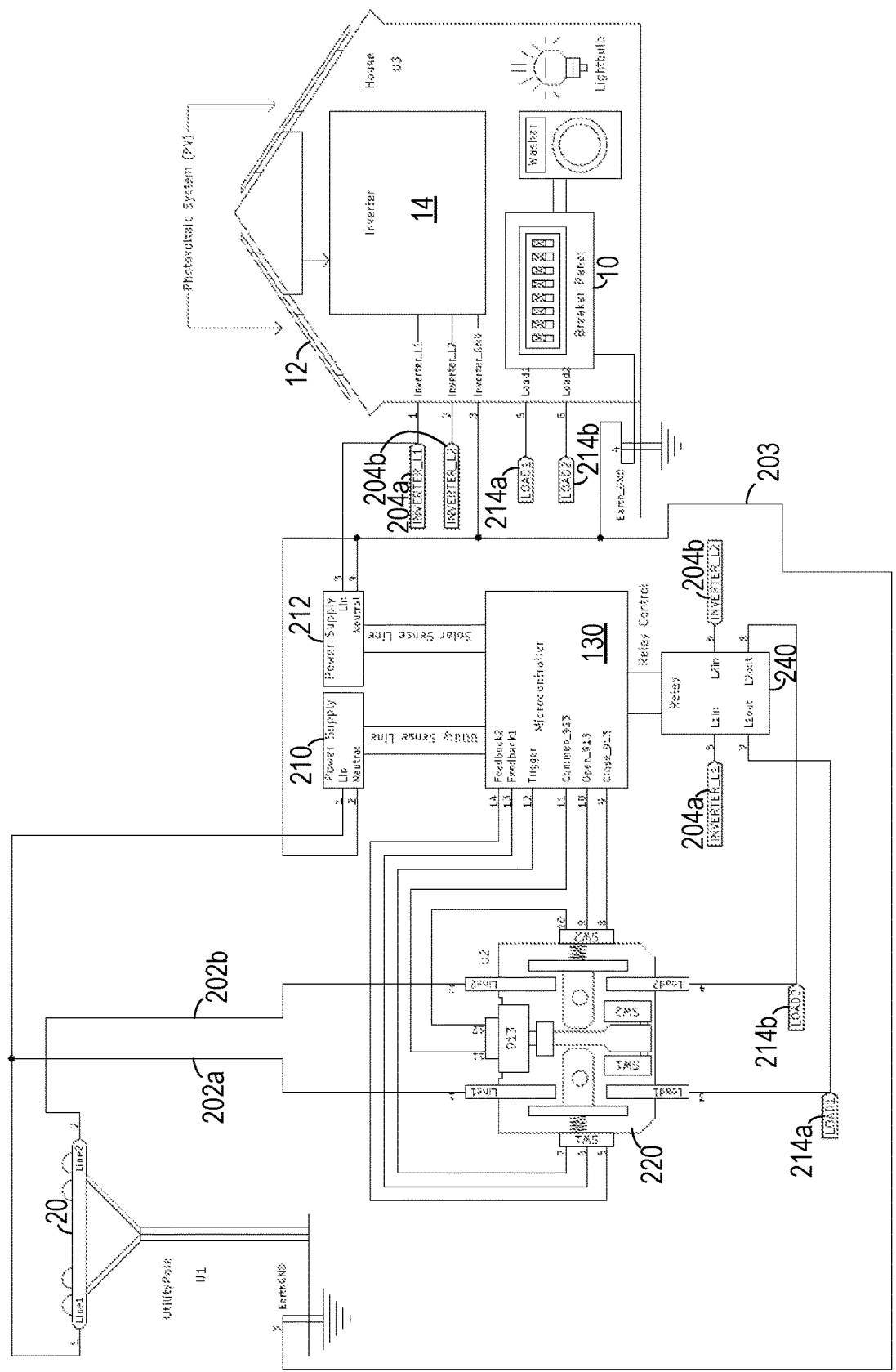
FIG. 2 is a schematic diagram on one commercial embodiment employed with a photovoltaic system.

As shown in FIG. 2, one commercial embodiment can be used in a system in which the grid power source 20 includes a first grid power line 202*a* and a second grid power line 202*b* that is 180° out of phase with the first grid power line 202*a*, both of which have a voltage relative to a common ground line 203. The inverter 14 delivers power on a first inverter power line 204*a* and a second inverter power line 204*b* that is 180° out of phase with the first power line 204*a*, both of which are in phase with the power from the grid power source 20. The microcontroller 130 is powered by a grid power supply 210 and an inverter power supply 212. The microcontroller 130 controls a two-line relay 220, which selectively couples the first grid power line 202*a* to a first sub-node 214*a* and second grid power line 202*b* to a second sub-node 214*b*. The inverter relay 240 selectively couples the first inverter power line 204*a* to a first sub-node 214*a* and second inverter power line 204*b* to a second sub-node 214*b*.

Figure 3A:
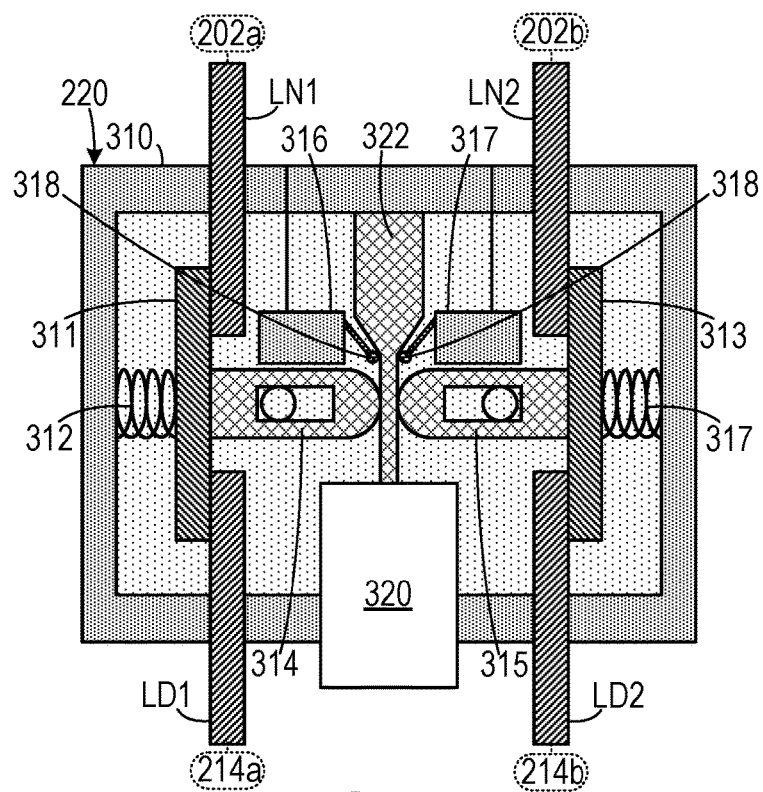
FIGS. 3A-3B are schematic diagrams of a grid relay in two different states.
Figure 3B:
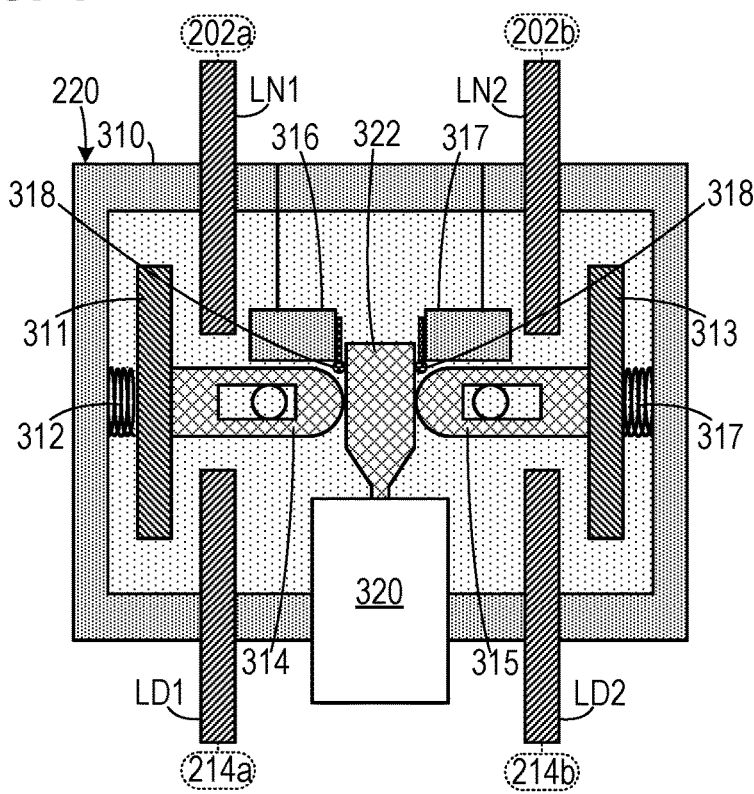

As shown in FIGS. 3A-3B, one embodiment of a grid power relay 220 includes a housing 310, which in one embodiment includes an injection-molded plastic. A first grid contact LN1 (that is coupled to the first grid power line 202*a*) and a second grid contact LN2 (that is coupled to the second grid power line 202*b*) are held in a fixed relationship with the housing 310. Similarly, a first load contact LD1 (that is coupled to the first sub-node 214*a*) and a second load contact LD2 (that is coupled to the second sub-node 214*b*) are held in a fixed relationship with the housing. A first moving contact first inverter contact 311 is in a movable relationship with the housing and movable between contacting both the first grid contact LN1 and the first load contact LD1, thereby selectively electrically coupling the first grid contact LN1 to the first load contact LD1. A first spring 312 pushes the first moving contact 311 toward the first grid contact LN1 and the first load contact LD1. A first arm 314 is in sliding relationship along a first direction relative to the housing 310 and is coupled to the first moving contact 311. Similarly, a second moving contact second inverter contact 313 is in a movable relationship with the housing and movable between contacting both the second grid contact LN2 and the second load contact LD2, thereby selectively electrically coupling the second grid contact LN2 to the second load contact LD2. A second spring 317 pushes the second moving contact 313 toward the second grid contact LN2 and the second load contact LD2. A second arm 315 is in sliding relationship along a second direction relative to the housing 310 and is coupled to the second moving contact 313.

A plunger 322 has a first position (as shown in FIG. 3A) which allows the first spring 312 to push the first moving contact 311 into a closed position that electrically couples first grid contact LN1 to the first load contact LD1 and that allows the second spring 317 to push the second moving contact 313 into a closed position that electrically couples second grid LN2 contact to the second load contact LD2. The plunger 322 also has a second position (as shown in FIG. 3B) which pushes the first arm 314 and the first moving contact 311 into an open position that electrically decouples first grid contact LN1 from the first load contact LD1 and that pushes the second arm 315 and the second moving contact 313 into an open position that electrically decouples second grid contact LN2 from the second load contact LD2. A driving mechanism 320, which can include a solenoid to apply mechanical force to the plunger 322, selectively moves the plunger 322 between the first position and the second position. A sensor system, such as a first micro-switch 316, senses if the plunger 322 is in the first position or in the second position. This information is shared with the microcontroller to indicate if the relay 220 is in the open state or the closed state when grid power is not available. A second micro-switch 317 provides state information about the plunger 322 so that voltage of the proper polarity is applied to the driving mechanism when it changes the state of the plunger 322. The first micro-switch 316 and the second micro-switch 317 each include a probe 318 that is in contact with the plunger 322 and that moves as the plunger 322 moves.

Figure 4:
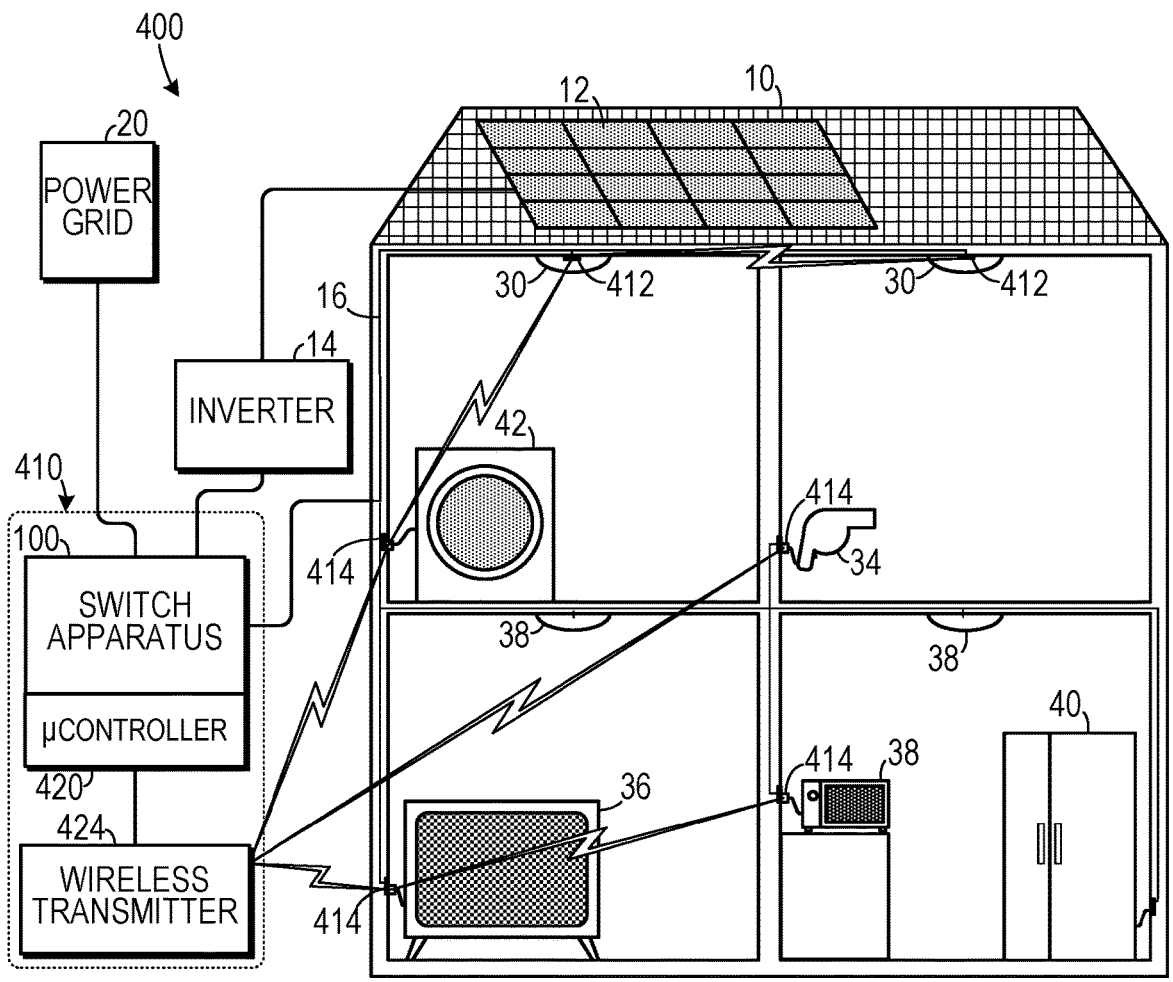
FIG. 4 is a schematic diagram one embodiment of a switching apparatus that includes an automatic system for de-powering of nonessential loads.

As shown in FIG. 4, one embodiment of the invention can include a power management system 410 for switching off non-essential loads during a grid power outage. Each load connected to the electrical distribution system 16 will be classified as either essential or non-essential. Examples of essential loads could include, for example, a refrigerator 40 and main floor lights 38 (in certain embodiments, things like medical equipment and emergency devices could also be classified as essential loads). Examples of non-essential loads could include such things as, for example, non-main lighting 30, television sets 36, microwave ovens 38, hair dryers 34 and washing machines 42. Hardwired non-essential loads will be hardwired to a wireless signal-responsive switch 412 and plug-in non-essential loads may be plugged in to a repositionable wireless signal-responsive switch 414. The system 410 includes a processor or controller 420 that is integrated with the switch apparatus 100 (and which can actually be functionality added to microcontroller 130 in FIG. 1A) that controls a wireless transmitter 424, which is configured to send out a wireless disconnect signal when a grid power failure is detected. Upon receiving the disconnect signal, the wireless signal-responsive switches 412 and 414 will disconnect the non-essential loads from the power distribution system 16. In one embodiment, the device 410 can also be configured to send a wireless signal to the signal-responsive switches 412 and 414, causing them to reconnect the non-essential loads to the power distribution system 16 when the controller 420 detects that grid power has been restored.

Figure 5:
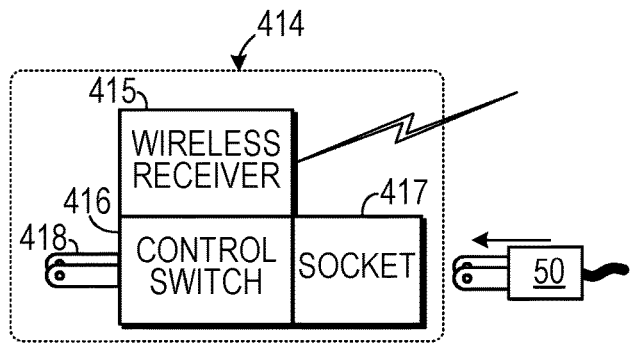
FIG. 5 is a schematic diagram of a decoupling device that intervenes between a wall socket and a nonessential load.

The repositionable wireless signal-responsive switches 414, as shown in FIG. 5, can include a wireless receiver 415 that controls a switch 416 that is electrically coupled to a switch plug 418 and a socket 417. The plug 50 for a non-essential load plugs into the socket 417 and plug 418 plugs into a normal socket connected to the power distribution system 16. When a disconnect signal is received by the wireless receiver 415, the control switch 416 causes plug 418 to be disconnected from socket 417 so as to disconnect plug 50 from the power distribution system 16.

Figure 6:
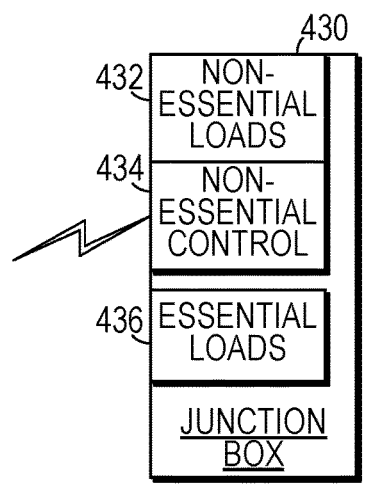
FIG. 6 is a schematic diagram of a junction box that can decouple wiring runs to nonessential loads from a power distribution system.

While hardwired wireless signal-responsive switches 412 are shown in FIG. 4, in one alternate embodiment, as shown in FIG. 6, a central junction box 430 connected to the power distribution system 16 can include both essential load breakers 436 and non-essential load breakers 432 that are controlled by non-essential load controllers 434, which are responsive to the wireless signals from the wireless transmitter 424.

This embodiment of the invention offers the advantage of reducing the power consumed from alternate power sources (or storage batteries) during grid power failures, thereby ensuring that the alternate power source provides adequate power for essential loads and that the power available from storage batteries is extended.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A power management system for managing a plurality of essential loads and a plurality of nonessential loads that can be fed electric power from an alternate power source and from a grid power source, a power distribution network configured to receive power from an inverter that receives power from the alternate power source, wherein the grid power source includes a first grid power line and a second grid power line that is 180° out of phase with the first grid power line and wherein the inverter delivers power on a first inverter power line and a second inverter power line that is 180° out of phase with the first power line, the power management system comprising:
   (a) power distribution network for transmitting power from the alternate power source and the grid power source to the essential loads and to the nonessential loads;
   (b) a grid power sensor that senses a grid power failure;
   (c) a wireless transmitter that is coupled to the grid power sensor that transmits a decouple signal when the grid power sensor detects a grid power failure; and
   (d) a plurality couplers that selectively couple the nonessential loads to the power distribution network, each of the plurality of couplers including a wireless receiver and a switch that responsive to the wireless receiver and that decouples one of the nonessential loads from the power distribution network when the decouple signal is received;
   (e) a first node, configured to be coupled to the load;
   (f) a grid relay that couples the grid power source to the first node when in a closed state and that decouples the grid power source from the first node when in an open state, the grid relay including:
   (i) a housing;
   (ii) a first grid contact in a fixed relationship with the housing and a second grid contact in a fixed relationship with the housing;
   (iii) a first load contact in a fixed relationship with the housing and a second load contact in a fixed relationship with the housing;
   (iv) a first moving contact in a movable relationship with the housing and movable between contacting both the first grid contact and the first bad contact, thereby electrically coupling the first grid contact to the first bad contact, and not contacting at least one of the first grid contact and the first bad contact, thereby electrically decoupling the first grid contact from the first load contact, and a second moving contact in a movable relationship with the housing and movable between contacting both the second grid contact and the second load contact, thereby electrically coupling the second grid contact to the second load contact, and not contacting at least one of the second grid contact and the second load contact, thereby electrically decoupling the second grid contact from the second load contact; and
   (v) a state mechanism that forces the first moving contact to electrically couple the first grid contact to the first load contact and simultaneously forces the second moving contact to electrically couple the second grid contact to the second load contact thereby driving the grid relay into the closed state and that forces the first moving contact to electrically decouple couple the first grid contact from the first load contact and simultaneously forces the second moving contact to electrically decouple the second grid contact to the second bad contact thereby driving the grid relay into the open state;
   (g) an inverter relay that couples the inverter to the first node when in a closed state and that decouples the inverter from the first node when in an open state; and
   (h) a controller that is responsive to the grid power sensor and that is programmed to:
   (i) cause the grid relay to be in the closed state and cause the inverter relay to be in the closed state when the grid power sensor indicates power is available from the grid;
   (ii) cause the grid relay to be in the open state when the grid power sensor indicates that power is not available from the grid; and
   (iii) cause the inverter relay to be in the open state when the grid power sensor indicates power is not available from the grid and when feedback from the grid relay indicates that the grid relay is in the closed state.

2. The power management system of claim 1, wherein the alternate power source comprises an alternative power source selected from a list consisting of: a photovoltaic system, a wind power system, a hydroelectric power system, a thermoelectric power system, and combinations thereof.

3. The power management system of claim 1, wherein the state mechanism comprises:
   (a) a first spring that pushes the first moving contact toward the first grid contact and the first load contact and a second spring that pushes the first moving contact toward the second grid contact and the second load contact;
   (b) a first arm in sliding relationship along a first direction relative to the housing and coupled to the first moving contact and a second arm in sliding relationship along a second direction relative to the housing and coupled to the second moving contact;
   (c) a plunger that has a first position which allows the first spring to push the first moving contact into a closed position that electrically couples first grid contact to the first load contact and that allows the second spring to push the second moving contact into a closed position that electrically couples second grid contact to the second load contact, the plunger also having a second position which pushes the first moving contact into an open position that electrically decouples first grid contact from the first load contact and that pushes the second moving contact into an open position that electrically decouples second grid contact from the second load contact;
   (d) a driving mechanism that selectively moves the plunger between the first position and the second position; and
   (e) a sensor system that senses if the plunger is in the first position or in the second position.

4. The power management system of claim 3, wherein the driving mechanism comprises a solenoid.

5. The power management system of claim 3, wherein the sensor system includes a first micro-switch that includes a first probe in contact with the plunger and a second microswitch that includes a second probe in contact with the plunger.

6. The power management system of claim 5, wherein the controller feeds power to the first micro-switch and to the second micro-switch, and wherein the controller receives a first feedback signal from the first micro-switch and wherein the driving mechanism receives feedback from the second micro-switch.

7. The power management system of claim 6, wherein the controller is programmed to cause the inverter relay to be in the open state when the grid power sensor indicates that power is not available from the grid and when the first micro-switch indicates that the first moving contact and the second moving contact are in the closed position.

8. The power management system of claim 1, further comprising:
   (a) a first power supply that supplies power to the controller from the power grid; and
   (b) a second power supply that supplies power to the controller from the inverter.

9. The power management system of claim 1, wherein the controller is programmed to cause the grid relay to be in the open state when voltage from the first power supply falls below a predetermined threshold.

10. An electric power management system for managing a plurality of essential loads and a plurality of nonessential loads that can be fed electric power from an inverter that is coupled to an alternate power source and from a grid power source, wherein the grid power source includes a first grid power line and a second grid power line that is 180° out of phase with the first grid power line and wherein the inverter delivers power on a first inverter power line and a second inverter power line that is 180° out of phase with the first grid power line, the electric power management system comprising:
   (a) a power distribution network for transmitting power from the alternate power source and the grid power source to the essential loads and to the nonessential loads;
   (b) a power management apparatus that includes:
   (i) a first node, configured to be coupled to the load;
   (ii) a grid power sensor that senses a state of the grid power source;
   (iii) a grid relay that couples the grid power source to the first node when in a closed state and that decouples the grid power source from the first node when in an open state, wherein the grid relay includes:
   (1) a housing;
   (2) a first grid contact in a fixed relationship with the housing and a second grid contact in a fixed relationship with the housing;
   (3) a first load contact in a fixed relationship with the housing and a second load contact in a fixed relationship with the housing;
   (4) a first moving contact in a movable relationship with the housing and movable between contacting both the first grid contact and the first load contact, thereby electrically coupling the first grid contact to the first load contact, and not contacting at least one of the first grid contact and the first load contact, thereby electrically decoupling the first grid contact from the first load contact, and a second moving contact in a movable relationship with the housing and movable between contacting both the second grid contact and the second load contact, thereby electrically coupling the second grid contact to the second load contact, and not contacting at least one of the second grid contact and the second load contact, thereby electrically decoupling the second grid contact from the second load contact; and
   (5) a state mechanism that forces the first moving contact to electrically couple the first grid contact to the first bad contact and simultaneously forces the second moving contact to electrically couple the second grid contact to the second load contact thereby driving the grid relay into the closed state and that forces the first moving contact to electrically decouple couple the first grid contact from the first load contact and simultaneously forces the second moving contact to electrically decouple the second grid contact to the second load contact thereby driving the grid relay into the open state;
   (iv) an inverter relay that couples the inverter to the first node when in a closed state and that decouples the inverter from the first node when in an open state; and
   (v) a controller that is responsive to the grid power sensor and that is programmed to:
   (1) cause the grid relay to be in the closed state and cause the inverter relay to be in the closed state when the grid power sensor indicates power is available from the grid;
   (2) cause the grid relay to be in the open state when the grid power sensor indicates that power is not available from the grid; and
   (3) cause the inverter relay to be in the open state when the grid power sensor indicates power is not available from the grid and when feedback from the grid relay indicates that the grid relay is in the closed state;
   (c) a wireless transmitter that is coupled to the grid power sensor that transmits a decouple signal when the grid power sensor detects a grid power failure; and
   (d) a plurality couplers that selectively couple the nonessential loads to the power distribution network, each of the plurality of couplers including a wireless receiver and a switch that is responsive to the wireless receiver and that decouples one of the nonessential loads from the power distribution network when a decouple signal is received.

11. The electric power management system of claim 10, wherein the alternate power source comprises an alternative power source selected from a list consisting of: a photovoltaic system, a wind power system, a hydroelectric power system, a thermoelectric power system, and combinations thereof.

12. The electric power management system of claim 10, wherein the state mechanism comprises:
   (b) a first spring that pushes the first moving contact toward the first grid contact and the first load contact and a second spring that pushes the first moving contact toward the second grid contact and the second load contact;
   (c) a first arm in sliding relationship along a first direction relative to the housing and coupled to the first moving contact and a second arm in sliding relationship along a second direction relative to the housing and coupled to the second moving contact;
   (d) a plunger that has a first position which allows the first spring to push the first moving contact into a closed position that electrically couples first grid contact to the first load contact and that allows the second spring to push the second moving contact into a closed position that electrically couples second grid contact to the second load contact, the plunger also having a second position which pushes the first moving contact into an open position that electrically decouples first grid contact from the first load contact and that pushes the second moving contact into an open position that electrically decouples second grid contact from the second load contact;

(e) a driving mechanism that selectively moves the plunger between the first position and the second position; and (f) a sensor system that senses if the plunger is in the first position or in the second position.

13. The electric power management system of claim 12, wherein the driving mechanism comprises a solenoid.

14. The electric power management system of claim 12, wherein the sensor system includes a first micro-switch that includes a first probe in contact with the plunger and a second micro-switch that includes a second probe in contact with the plunger.

15. The electric power management system of claim 14, wherein the controller feeds power to the first micro-switch and to the second micro-switch, and wherein the controller receives a first feedback signal from the first micro-switch and wherein the driving mechanism receives feedback from the second micro-switch.

16. The electric power management system of claim 15, wherein the controller is programmed to cause the inverter relay to be in the open state when the grid power sensor indicates that power is not available from the grid and when the first micro-switch indicates that the first moving contact and the second moving contact are in the closed position.

* * * * *